June 21, 1932.  W. G. PRENTICE  1,863,764
TIRE MACHINE
Filed Dec. 5, 1929  6 Sheets-Sheet 1

INVENTOR
WILLIAM G. PRENTICE
BY
Fisher, Moser & Moore
ATTORNEY

June 21, 1932.   W. G. PRENTICE   1,863,764
TIRE MACHINE
Filed Dec. 5, 1929   6 Sheets-Sheet 6

INVENTOR
WILLIAM G. PRENTICE
BY
Fisher, Moser + Moore
ATTORNEY

Patented June 21, 1932

1,863,764

UNITED STATES PATENT OFFICE

WILLIAM G. PRENTICE, OF INDIANAPOLIS, INDIANA, ASSIGNOR TO THE ELITE MANUFACTURING COMPANY, OF ASHLAND, OHIO, A CORPORATION OF OHIO

TIRE MACHINE

Application filed December 5, 1929. Serial No. 411,938.

The present invention to a tire machine, and the primary purpose of the invention is to provide a motor driven machine adapted to facilitate the opening and inspection of a tire casing, and the repair of any defects or injuries therein. Accordingly, the machine is particularly constructed to support a split tire or casing in a vertical plane and on its tread, and to open or spread a sector of the tire in lesser or greater degree, and then to revolve the tire while it is spread open and held open, thereby openly exposing the interior of the tire, step by step and sector by sector, circumferentially of the tire. The machine also embodies a presser member or repair shoe arranged centrally in respect to the revolving and spreading devices so that the tire may be additionally supported or buckled inwardly in the sector where spread open. The spreading devices are also arranged to coact with the means for revolving the tire so that adequate frictional driving contact may be constantly maintained between the tire and the driving rollers. The machine also includes a buffing wheel attachment adapted to be coupled to the driving mechanism, and to be used in repair operations, while the tire is spread open and either stationary or revolving. The construction and arrangement of the working parts of the machine also permit the tire to be conveniently placed within the machine and readily removed therefrom.

Figure 1:
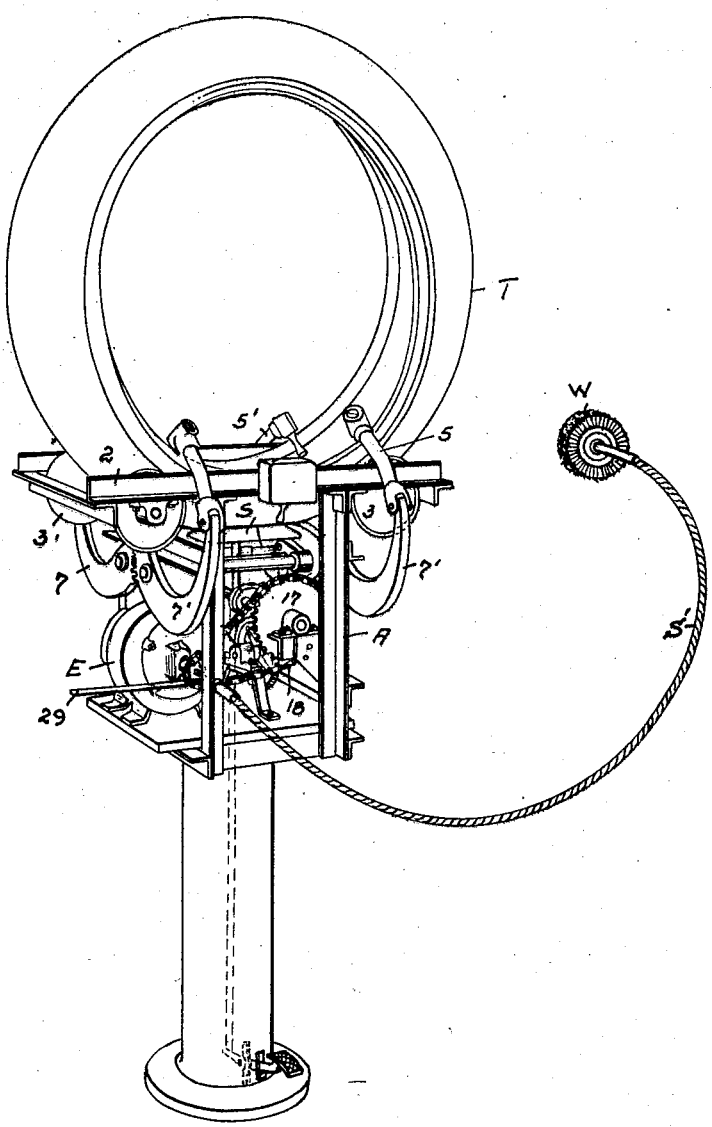
Figure 2:
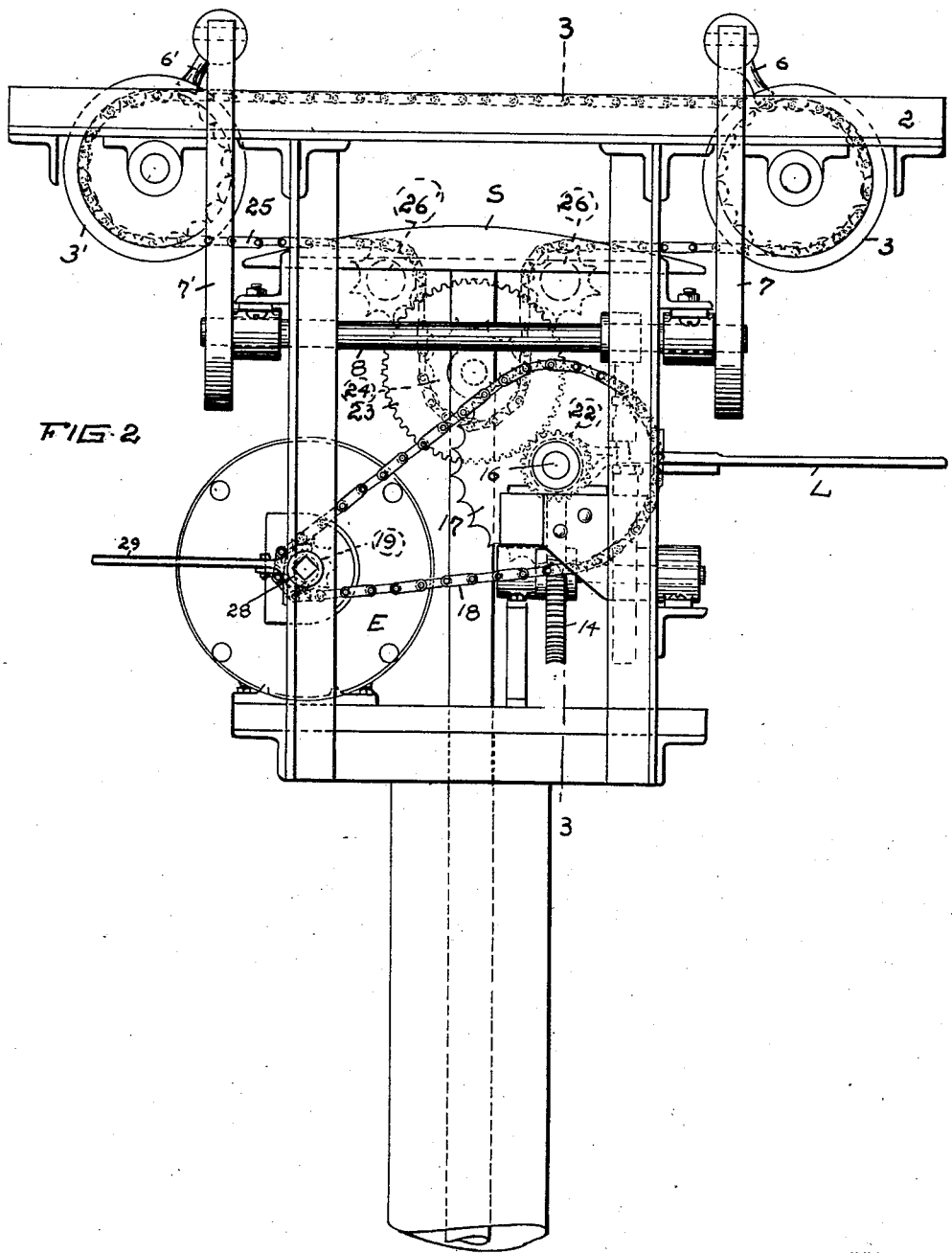
Figure 3:
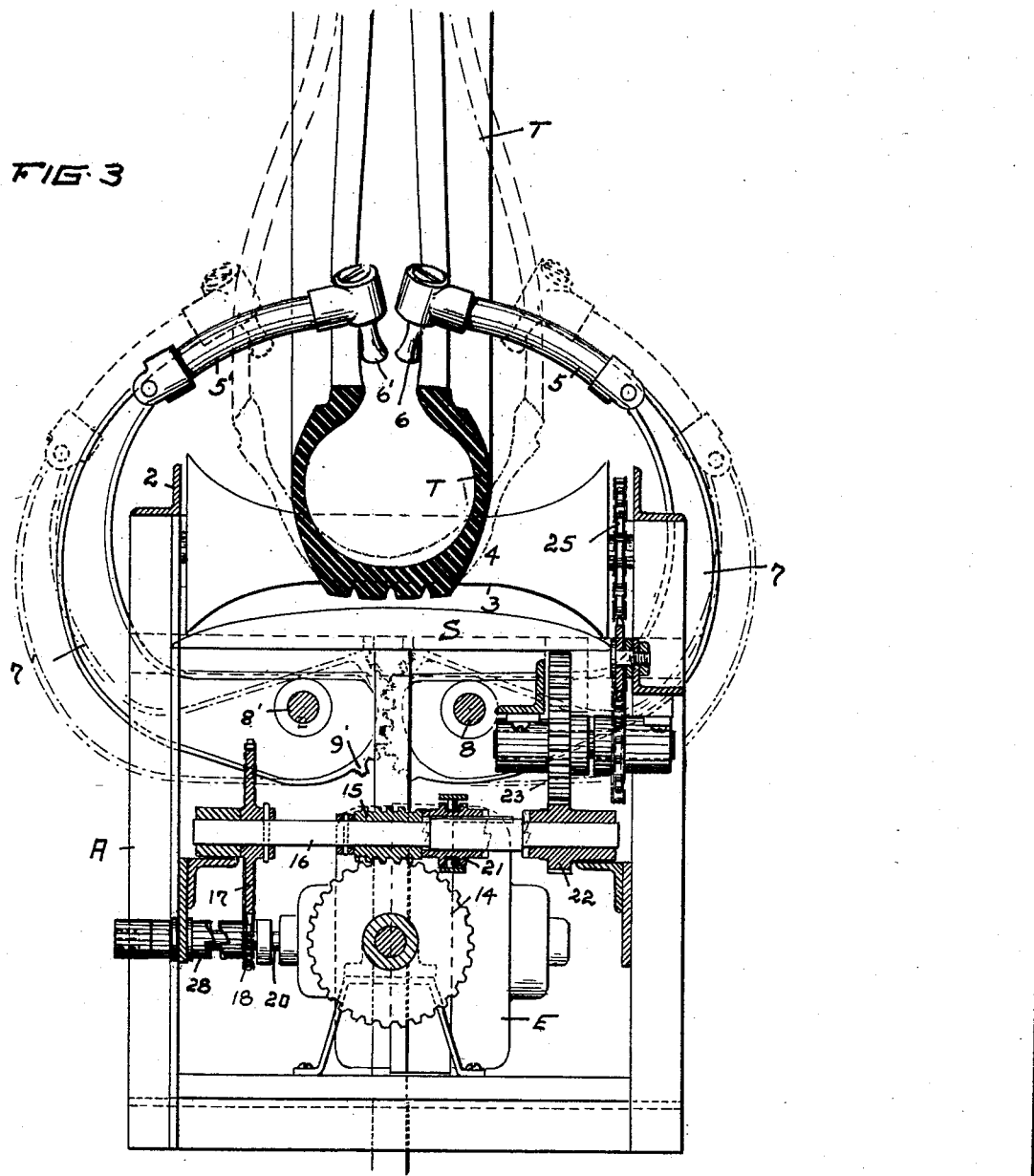
Figure 4:
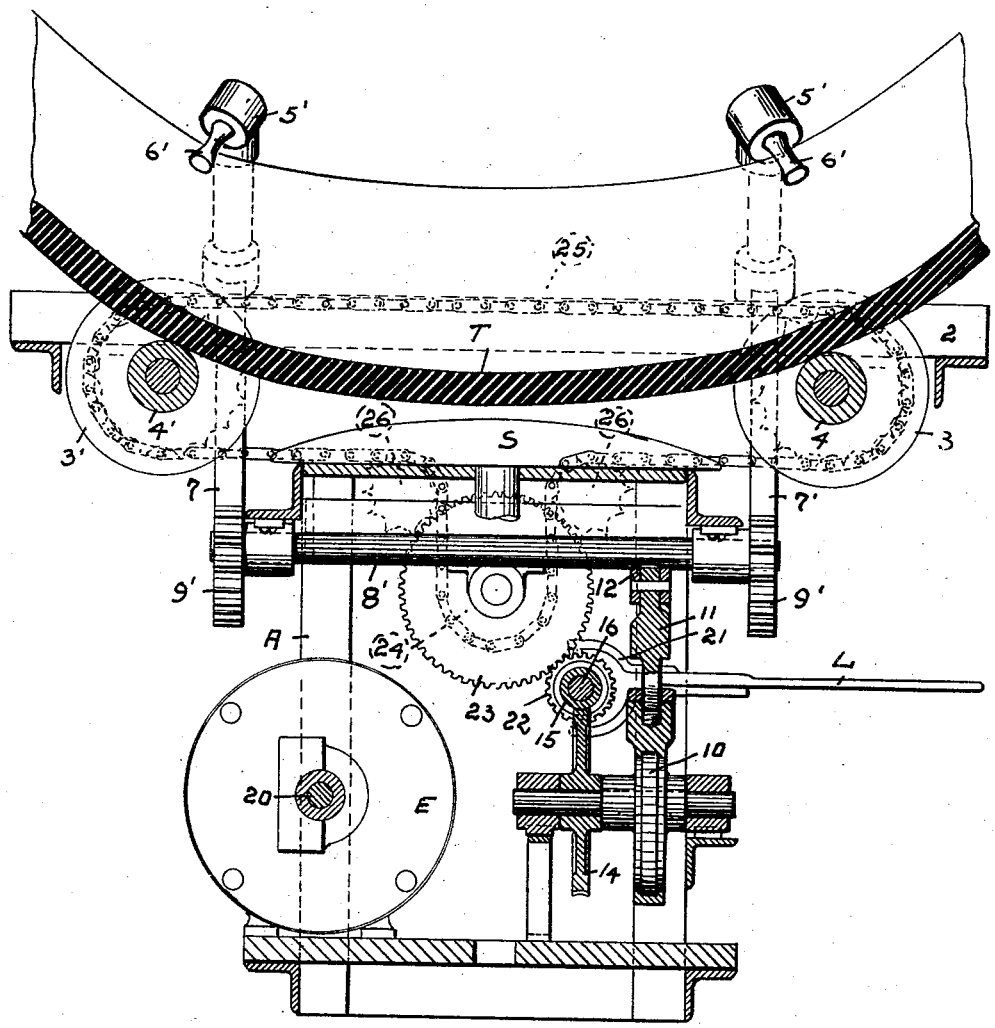
Figure 5:
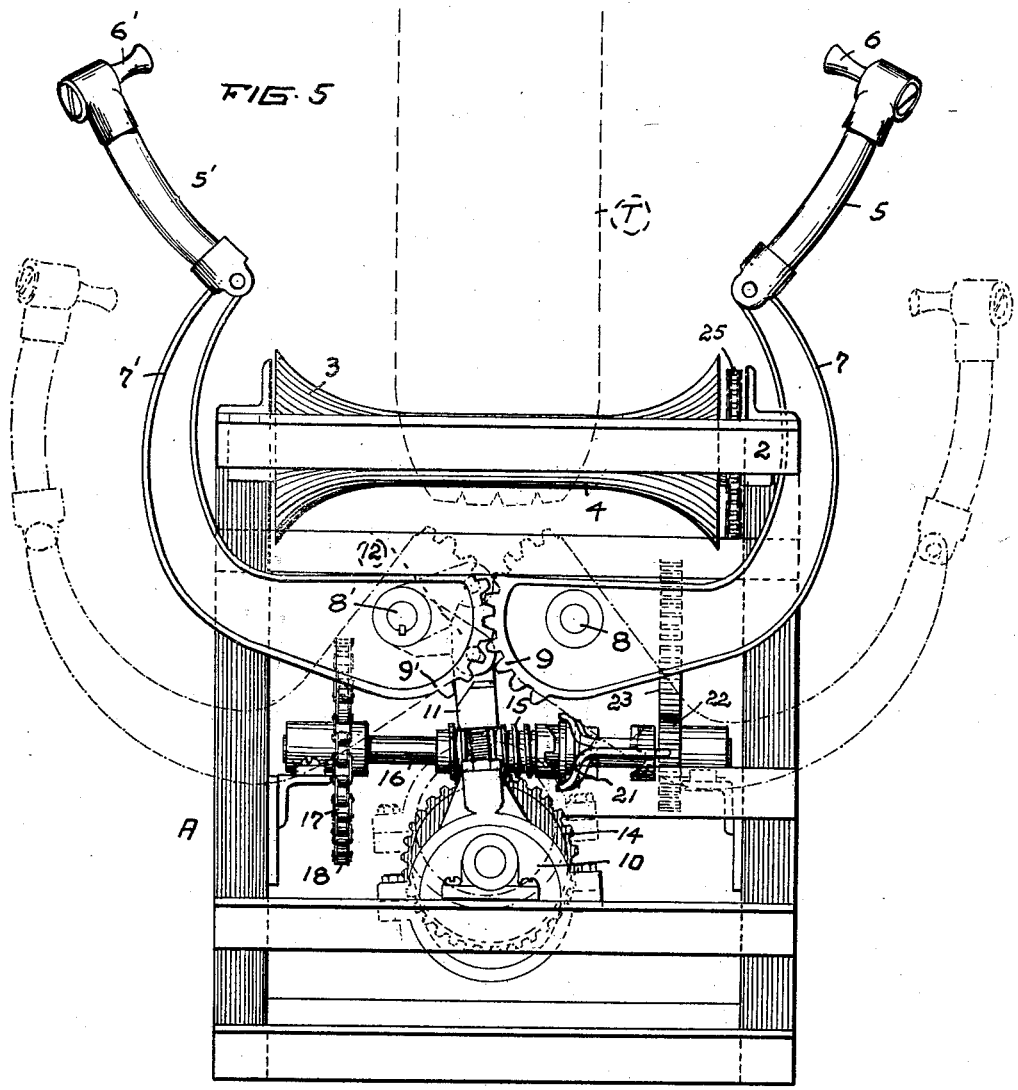
Figure 6:
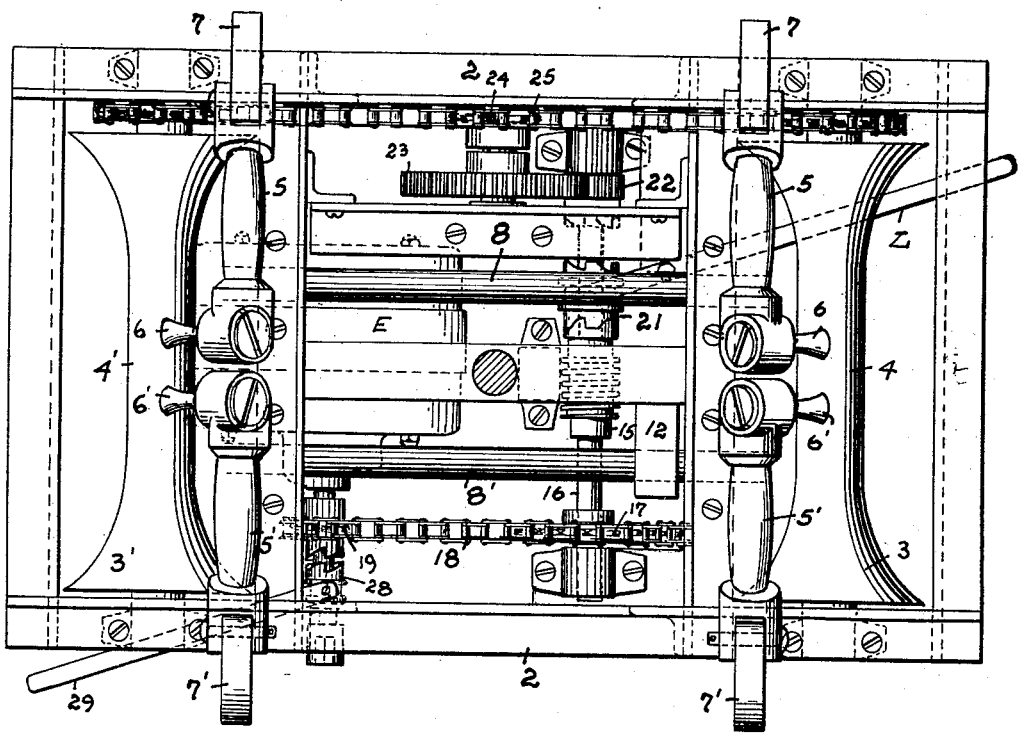

In the accompanying drawings, Fig. 1 is a perspective view of the machine with a tire supported therein. Fig. 2 is a front elevation of the machine without a tire. Fig. 3 is a vertical section transversely of the machine on line 3—3 of Fig. 2, showing a tire seated therein in full lines and also spread open in dotted lines. Fig. 4 is a vertical section longitudinally through the center of the machine and a tire seated therein. Fig. 5 is an end view of the machine, and Fig. 6 a top view thereof.

Figure 7:
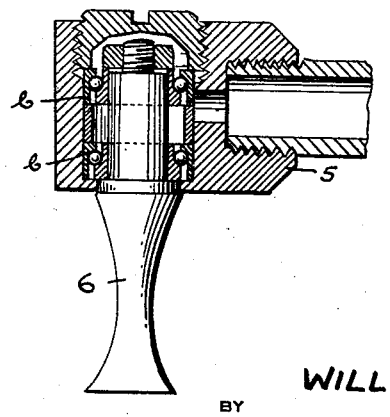

Fig. 7 is a sectional view of one of the spreading fingers and its ball bearing support within the outer end of a foldable arm.

The machine comprises a main frame A having an elevated open top portion 2 carrying a pair of elongated spool-shaped rollers 3—3' arranged parallelly in the same horizontal plane but spaced a substantial distance apart. The rollers are flanged or flared at their opposite ends and formed with reduced cylindrical portions 4—4' centrally to seat the tread portion of a split casing or tire T, thereby providing good frictional driving surfaces to revolve the tire when the tire is pressed downwardly upon the rollers and both rollers are caused to revolve in the same direction.

The tire is pressed and held upright upon the driving rollers, and the tread portion of the tire T also caused to flatten itself in some degree upon the cylindrical portions of the rollers, by spreading and holding the divided base portions of the tire open and apart. The spreading devices include two sets of hinged arms 5—5' arranged to swing in pairs directly above each roller and substantially parallel therewith or inclined on converging lines in respect thereto. The arms 5—5' carry rotatable fingers 6—6', respectively, which extend toward the driving rollers, preferably toward the axis of the rollers and radially in respect to the tire. The fingers 6—6' are curved or concaved and operate as rolling pulling members when they are engaged with the inner annular edges of the split base portion or side wings of tire T, thereby reducing friction at that point when the tire is revolving and while the fingers are being used to spread the tire open. To reduce the friction to a minimum, the fingers or rollers 6—6' may be supported and confined within ball or roller bearings $b$ fastened within the free ends of the foldable arms 5—5'. These arms are hinged or pivotally connected to the upper ends of a corresponding pair of reciprocable members or oscillatory levers 7—7' which are curved upwardly and free to swing outwardly in respect to frame A. Levers 7—7' are secured to a pair of rock shafts 8—8' extending across the machine beneath and between the driving rollers 3—3'. Preferably, the shafts 8—8' are located in a lower horizontal plane than the rollers 3—3' and centrally between the ends of the rollers or in substantially the same vertical plane as the sides of the tire. Each set of oscillatory levers 7—7', or their respective rock shafts, are geared together to effect conjoint movement of the levers in opposite directions, and in the present instance the inner ends of the levers are provided with sector gears or gear teeth 9—9' which are in mesh to oscillate the levers in unison when one rock shaft is oscillated. Power for that purpose is derived from an electric motor E and suitable power transmitting gearing, including an eccentric 10, an eccentric strap and coupling rod 11, and a crank arm 12 on one of the oscillatory shafts 8—8'. Eccentric 10 is rotated by a worm gear 14, which is operated in turn by a worm pinion 15 sleeved on a countershaft 16. This countershaft is driven by a sprocket gear 17, a sprocket chain 18, and a sprocket pinion 19 on motor shaft 20. The revoluble movement of countershaft 16 is transmitted to the two driving rollers 3—3' by a slidable clutch member 21 on shaft 16 and a pair of small and large meshed gears 22 and 23, respectively. The larger gear 23 drives a sprocket wheel 24, and an endless sprocket chain 25 looped around the wheel, and this chain passes around a pair of sprocket gears 26—26' carried by or connected with the two driving rollers 3—3', respectively. Clutch member 21 is slidably keyed to countershaft 16, and the worm pinion 15 and gear 22 at opposite ends of clutch member 21 are loosely sleeved on the same shaft. When clutch member 21 is in a neutral position, no movement is transmitted to either the driving rollers or the spreading members, but by shifting the clutch members in opposite directions alternatively, movement is imparted to either the tire driving rollers or to the tire spreading members. Thus by throwing clutch member 21 in one direction to connect with worm 15 the tire will spread open, and then by shifting the clutch member to a neutral position, the tire will be held open in the degree as spread. The clutch member may then be shifted to engage gear 22, thereby rotating both rollers 7—7' in the same direction. When the tire is spread open by the outward and downward pull of the fingers 6—6' it is pressed firmly down upon the revolving rollers, thereby causing the tire to revolve and expose successive sectors of the tire to view in the area between the two rollers and the double set of spreading devices. Should examination and investigation disclose a defect, cut or injury to the internal wall of the tire, the clutch member can be thrown into neutral at any time. That is, the clutch member is controlled by a manually operable lever L or other tripping device, whereby the tire may be caused to revolve and then stopped at any desired point in its revoluble travel over the top of the machine and relatively to a repair shoe or presser member S mounted within frame A midway between the rollers 3—3'. A reversible motor or reversing mechanism may also be used to revolve the tire in either direction at the election of the operator. A treadle or any suitable means may be used to raise and lower the shoe to support the tire or to press the tire upwardly while it is spread open. The shoe can also be used to buckle the tire inwardly in still greater degree than as caused by spreading it open, thereby permitting the tire to be stretched to open or show punctures, or cuts, and to make repairs at such places before releasing and removing the tire from the machine, or causing it to revolve for further inspection and repairs.

Preliminary to actually applying a patch the surface of the tire is usually cleansed and buffed. To facilitate that operation, while the tire is either stationary or revolving, a buffing wheel W is provided, which wheel is connected at one end of a flexible conduit and driving shaft S', and the opposite end detachably coupled to a clutch member 28 operated by motor E or the parts driven by the motor. As shown, clutch member 28 is attached to the motor shaft and controlled by a lever 29, see Fig. 6.

What I claim, is:

1. A tire machine, including a power unit and a set of co-operative devices actuated by said power unit for spreading a split tire open and revolving the tire about its own axis while it is held in a spread and open state.

2. A tire machine, comprising a pair of driving rollers adapted to seat and revolve a tire having a divided base portion, oscillatory devices for spreading the divided base portion of the tire, means for revolving said rollers and the tire, and selective means for controlling the respective operations of said driving rollers and oscillatory devices.

3. A tire machine, comprising a pair of revoluble rollers for seating and revolving a split tire, and hinged oscillatory devices for engaging and spreading the split portions of the tire during the revoluble movements thereof.

4. A tire machine, comprising a pair of revoluble rollers adapted to seat the tread portion of a tire split circumferentially at its outer circumference, a pair of co-acting devices associated with each roller for automatically spreading the split parts of the tire open while pulling the tread part of the tire against said rollers, means for revolving at least one of said rollers, and means for operating said spreading devices independently of said rollers.

5. In a tire machine, spaced rollers for seating and revolving a split tire, means for rotating said rollers, separate oscillatory tire-spreading members having hinged arms with revoluble gripping means in running engagement with the split portions of the tire, and means for operating said tire spreading members.

6. In a tire machine, revoluble means for rotating a split tire, and separate oscillatory tire spreading members on opposite sides of the tire having foldable extensions provided with revoluble gripping devices in running engagement with the split portions of the tire.

7. In a tire machine, means for revolving a split tire, and separate sets of oscillatory tire-spreading members located at opposite sides of the tire, having hinged arms provided with revoluble fingers adapted to engage and spread the split portions of the tire while the tire is revolving.

8. In a tire machine, revoluble rollers for seating a split tire, tire spreading devices arranged to pull the tire in frictional contact with said rollers, and power-transmitting devices for rotating said rollers and actuating said tire spreading devices independently and alternatively.

9. In a tire machine, revoluble rollers for seating a split tire, tire-spreading devices associated with said rollers adapted to press the tire during spreading proceedings in frictional contact with said rollers, power-transmitting means for revolving said rollers, power-transmitting mechanism for operating said tire-spreading devices, and controlling means for connecting said power-transmitting means and mechanism alternatively with a source of power.

10. In a tire machine, a set of revoluble rollers adapted to seat a split tire, separate sets of oscillatory levers having hinged arms adapted to be placed in overhanging relation with said rollers and split tire, said arms having revoluble fingers adapted to engage the split portions of the tire, mechanism adapted to oscillate said arms, gearing adapted to revolve said rollers, and a clutch for connecting either the said mechanism or gearing with a source of power.

11. In a tire machine, a pair of revoluble rollers for revolving a split tire, a pair of tire-spreading members associated with each roller having arms adapted to swing inwardly into the tire above said rollers, said arms having fingers engageable with the split portion of the tire; and power transmitting means for revolving said rollers and oscillating said tire-spreading members, including a controlling device permitting alternative operation of said rollers and tire-spreading members.

12. In a tire machine, spaced rollers adapted to seat a split tire; a pair of oscillatory levers associated with each roller and geared together to oscillate in unison; foldable extensions for said levers having revoluble fingers adapted to engage the split portions of the tire; power-transmitting gearing for revolving said rollers in the same direction; means including an eccentric for oscillating said levers; and a shiftable clutch for connecting said gearing and eccentric operating means alternatively with a source of power.

13. In a tire machine, a pair of spaced revoluble means for supporting and revolving a split tire, means associated with said tire-revolving means for spreading the tire and holding it open while the tire is revolving; and means centrally disposed in respect to said pair of tire-revolving means and tire-spreading means adapted to press upwardly against the circumference of the tire where spread open.

14. A tire machine, comprising means for spreading a split tire open, power driven means for revolving the tire about its own axis while it is held in a spread and open state by said first means, and an independently operable vertically movable presser-shoe located opposite the circumference of the tire where spread open.

In testimony whereof I affix my signature.
WILLIAM G. PRENTICE.